(12) United States Patent
Osoinach et al.

(10) Patent No.: US 9,921,125 B2
(45) Date of Patent: Mar. 20, 2018

(54) LEAK DETECTOR USING CAPACITANCE SENSOR

(71) Applicants: Bryce T. Osoinach, Phoenix, AZ (US); Lawrence T. Roshak, Chandler, AZ (US)

(72) Inventors: Bryce T. Osoinach, Phoenix, AZ (US); Lawrence T. Roshak, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 228 days.

(21) Appl. No.: 14/228,037

(22) Filed: Mar. 27, 2014

(65) Prior Publication Data
US 2015/0276544 A1     Oct. 1, 2015

(51) Int. Cl.
*G01R 27/26*     (2006.01)
*G01M 3/16*     (2006.01)

(52) U.S. Cl.
CPC .................... *G01M 3/16* (2013.01)

(58) Field of Classification Search
CPC .. G01N 27/223; G01N 27/048; G01N 27/121; G01N 27/22; G01N 27/227; G01N 33/246
USPC .......................... 324/664, 600, 649, 658, 663
See application file for complete search history.

(56) References Cited

U.S. PATENT DOCUMENTS

| | | | | |
|---|---|---|---|---|
| 4,001,185 A | * | 1/1977 | Mitsui | B60R 22/343 200/277 |
| 4,042,796 A | * | 8/1977 | Zink | H01H 35/144 200/61.45 R |
| 4,309,266 A | * | 1/1982 | Nakamura | H01J 37/3455 204/192.12 |
| 4,383,551 A | * | 5/1983 | Lynch | F16L 55/052 137/593 |
| 4,562,373 A | * | 12/1985 | Tokusima | H02N 2/08 310/12.04 |
| 4,832,850 A | * | 5/1989 | Cais | A61L 2/022 210/638 |
| 4,845,472 A | * | 7/1989 | Gordon | D06F 39/081 200/61.04 |
| 5,006,749 A | * | 4/1991 | White | B01L 3/502792 310/313 R |
| 5,024,686 A | * | 6/1991 | Lerner | B01D 47/00 261/118 |
| 5,123,671 A | * | 6/1992 | Driessen | B60G 17/018 188/266.5 |
| 5,159,276 A | | 10/1992 | Reddy, III | |
| 5,789,076 A | * | 8/1998 | Isohata | B01J 20/28033 428/315.9 |

(Continued)

*Primary Examiner* — Giovanni Astacio-Oquendo

(57) ABSTRACT

A system that holds a liquid such as water includes an electrode coupling the system to a surface. A capacitance sensor is coupled to the electrode. A processor is coupled to the capacitance sensor. The processor is adapted to receive a signal from the capacitance sensor to determine whether the liquid is present at the surface and to send one or more indication signals if liquid is present at the surface. A response circuit coupled to the processor causes the system to take responsive action in response to receipt of an indication signal. Responsive action includes causing the system to perform a failsafe action, such as automatic shutdown. A communication circuit notifies a user that a fault has occurred in the system over a network.

20 Claims, 4 Drawing Sheets

(56) References Cited

U.S. PATENT DOCUMENTS

| | | | | |
|---|---|---|---|---|
| 5,897,851 | A * | 4/1999 | Quay | A61B 8/481 |
| | | | | 424/9.5 |
| 5,961,507 | A * | 10/1999 | Widlund | A61F 13/15203 |
| | | | | 604/378 |
| 6,323,659 | B1 * | 11/2001 | Krahn | G01N 27/223 |
| | | | | 324/554 |
| 7,561,057 | B2 * | 7/2009 | Kates | G01M 3/002 |
| | | | | 340/605 |
| 7,802,471 | B2 | 9/2010 | Sieh et al. | |
| 7,960,978 | B2 * | 6/2011 | Keyes | F16L 59/143 |
| | | | | 138/104 |
| 2003/0020493 | A1 * | 1/2003 | Haase | G01F 1/712 |
| | | | | 324/664 |
| 2004/0007264 | A1 * | 1/2004 | Bootka | E03C 1/242 |
| | | | | 137/312 |
| 2005/0069178 | A1 * | 3/2005 | Nysaether | G06K 9/0002 |
| | | | | 382/124 |
| 2005/0203585 | A1 * | 9/2005 | Hairfield, Sr. | A61N 1/445 |
| | | | | 607/46 |
| 2006/0021419 | A1 * | 2/2006 | Cassidy | A61M 5/1411 |
| | | | | 73/19.01 |
| 2007/0069720 | A1 * | 3/2007 | Goldfine | G01N 27/72 |
| | | | | 324/240 |
| 2008/0001610 | A1 * | 1/2008 | Bae | G01N 27/223 |
| | | | | 324/664 |
| 2009/0126465 | A1 * | 5/2009 | Kedjierski | A47L 15/4212 |
| | | | | 73/40.5 R |
| 2009/0165552 | A1 * | 7/2009 | Sieh | G01F 23/265 |
| | | | | 73/304 C |
| 2012/0318923 | A1 * | 12/2012 | Stonestreet, II | B64D 15/12 |
| | | | | 244/134 D |
| 2013/0105307 | A1 * | 5/2013 | Pavlovic | C25B 11/02 |
| | | | | 204/262 |

* cited by examiner

LEAK DETECTOR USING CAPACITANCE SENSOR

FIELD

The disclosure relates generally to leak detection and more specifically to detection of liquids on surfaces.

BACKGROUND

Current water-filled appliances such as commercial and consumer dishwashers, laundry machines and the like may leak water, thus causing damage to the appliance and the surroundings, and thereby resulting in costly repairs and delays. Known leak detection methods rely on ground short detection, which can be hazardous, and therefore presents an unacceptable risk in most environments.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of systems and methods described herein provide for a way to detect a leak of a liquid onto a surface. These systems and methods stop operation of the system in response to the detection of the leak and report a system fault in a manner that does not require physical contact with the liquid onto the surface upon which the leak is occurring. This is achieved by employing an innovative combination of capacitance sensing to detect a liquid on a surface, response circuits to activate shutdown systems in response to the capacitive detection of the liquid, and communication circuits to notify the users or operators of the appliance that a fault has occurred so that they can respond to it.

Figure 1:
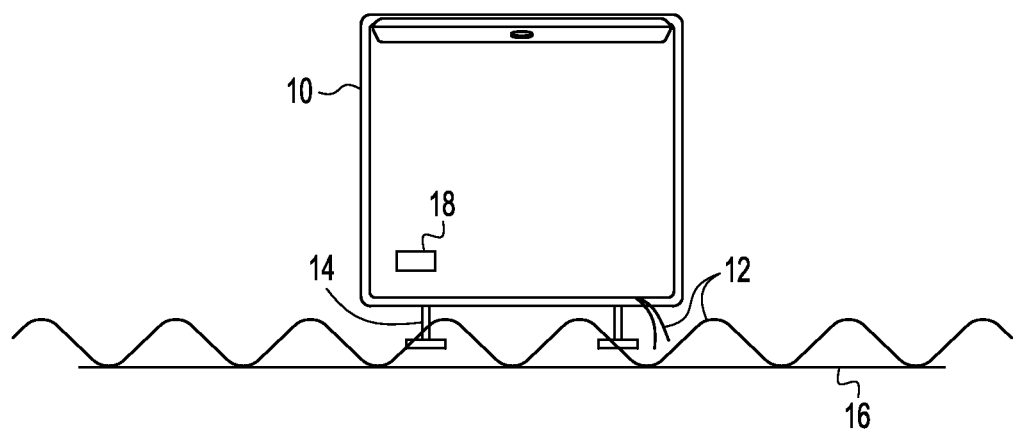
FIG. 1 is an illustrative view of an example application for detecting liquid on a surface using a capacitive sensor.

Advantageously, the embodiments and concepts of this disclosure are applicable to a wide variety of applications, including but not limited to, consumer and commercial appliances, consumer and commercial water or municipal liquid monitoring systems. FIG. 1 illustrates such an appliance that holds a liquid 12 such as water or water mixed with other substances. The system 10 is shown to include support elements 14 that support it on a surface 16. The system 10 may occasionally malfunction such that it leaks the liquid 12 it is holding onto the surface 16. The appliance 10 can detect a leak of the liquid 12 onto the surface 16, and respond to the detection of the leak, for example by shutting down the appliance.

The system 10 detects a leak of the liquid 12 onto the surface 16 by using capacitance sensing. In the system 10 of FIG. 1 embodied as a dishwasher, a capacitance sensor 18 located in the dishwasher is coupled to one of the support elements 14 to detect the presence of water on the surface 16. Capacitance sensing of water operates generally by detecting the change in capacitance that occurs when a change in the dielectric occupying the space between a capacitance sensor and an electrode occurs. Capacitance, C, is calculated as the area of the plates of a capacitor, "A", multiplied by the dielectric constant "e" of the dielectric between the plates, divided between the distance "d" between the plates: that is, C=Ae/d. When the area "A" of the plates of the capacitor is known and constant or controlled, and the distance "d" between the plates is a known constant, capacitance "C" changes if the dielectric between the plates changes. If the dielectric between the plates is initially air, which has a dielectric constant "e" of 1, but then is partially replaced with water, which has a dielectric constant "e" of approximately 80, the capacitance "C" between the plates changes. In the system 10, the capacitance sensor 18 senses the change in the dielectric field between the sensor 18 and the support element 14, as will be further described. The sensor sends a signal to electronic circuitry that can determine from the change in the sensor signal whether water is present on the surface and can respond for example by shutting down the system or shutting off the water.

Figure 2:
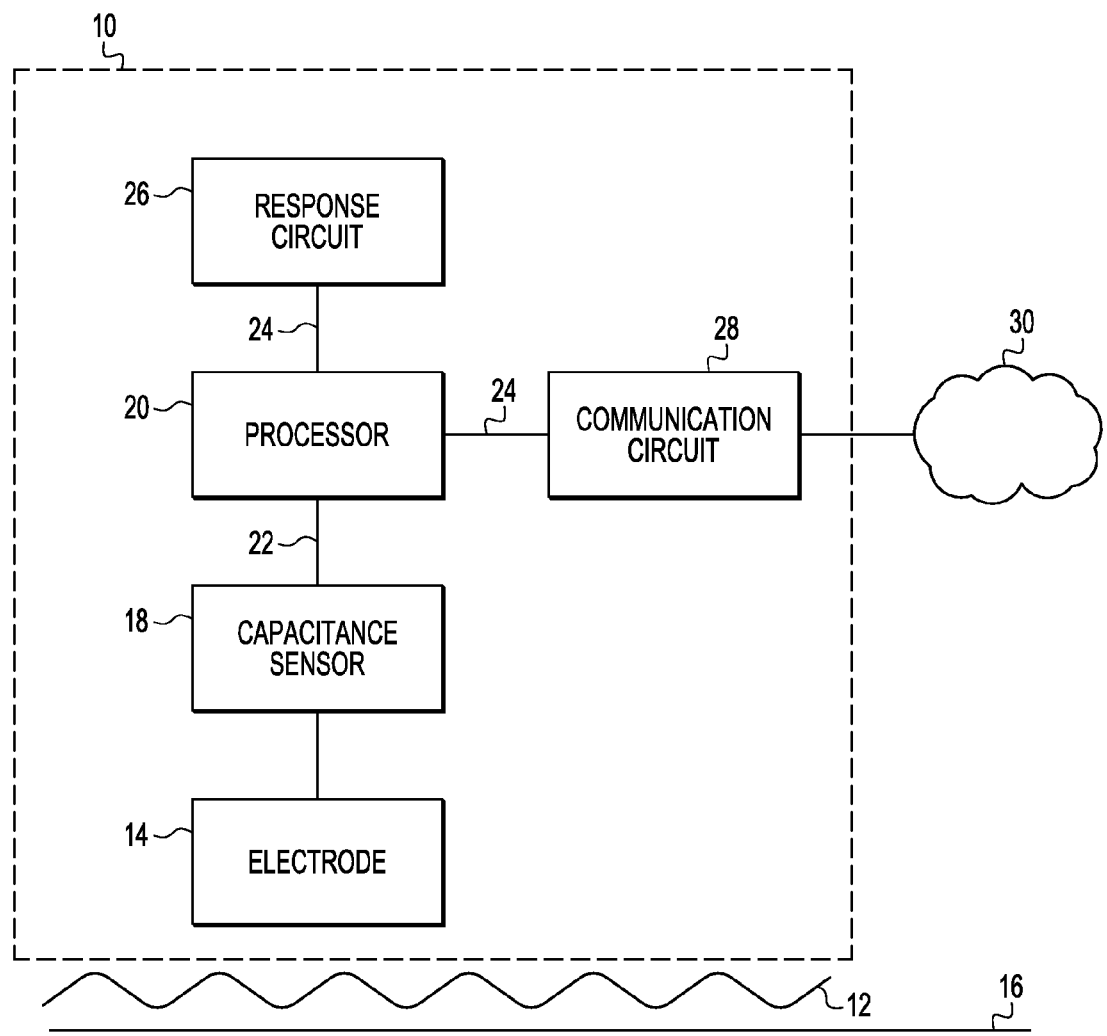
FIG. 2 is a block diagram of an embodiment of a system using a capacitive sensor for detecting a liquid on a surface and a response circuit for responding to the detection of the liquid on the surface.

FIG. 2 illustrates an embodiment of the system 10, including an appliance that stores or transfers a liquid such as water. System 10 includes the electrode 14, embodied as the support element in FIG. 1, for coupling the system to a surface 16. The system further includes the capacitance sensor 18 that is coupled to the electrode 14. A processor 20 is coupled to the capacitance sensor 18. The processor 20 is configured to receive a signal 22 from the capacitance sensor 18 to determine whether liquid 12 is present at the surface 16 and to transmit one or more indication signals 24 if the liquid 22 is present at the surface 14. A response circuit 26 coupled to the processor 20 is configured to cause the system 10 to take responsive action in response to receipt of one of the indication signals 24. Responsive action may include causing the system to perform a failsafe action, such as automatic shutdown, in response to the indication signal 24.

The system 10 may also include a communication circuit 28 configured to transmit a signal in response to an indication signal 24 that a system fault has occurred. The communication circuit 28 may be coupled to a network 30 and may be capable of transmitting a notification of a system fault by transmitting a message over the network 30 to a mobile phone or computer, as an instant message, email, proprietary application, or the like. Alternatively, the communication circuit 28 may be coupled to the response circuit 26. One of the responsive actions taken by the response circuit 26 can be to signal the communication circuit to transmit a message, for example to a custodian to indicate that a fault has occurred with the system 10.

Figure 3:
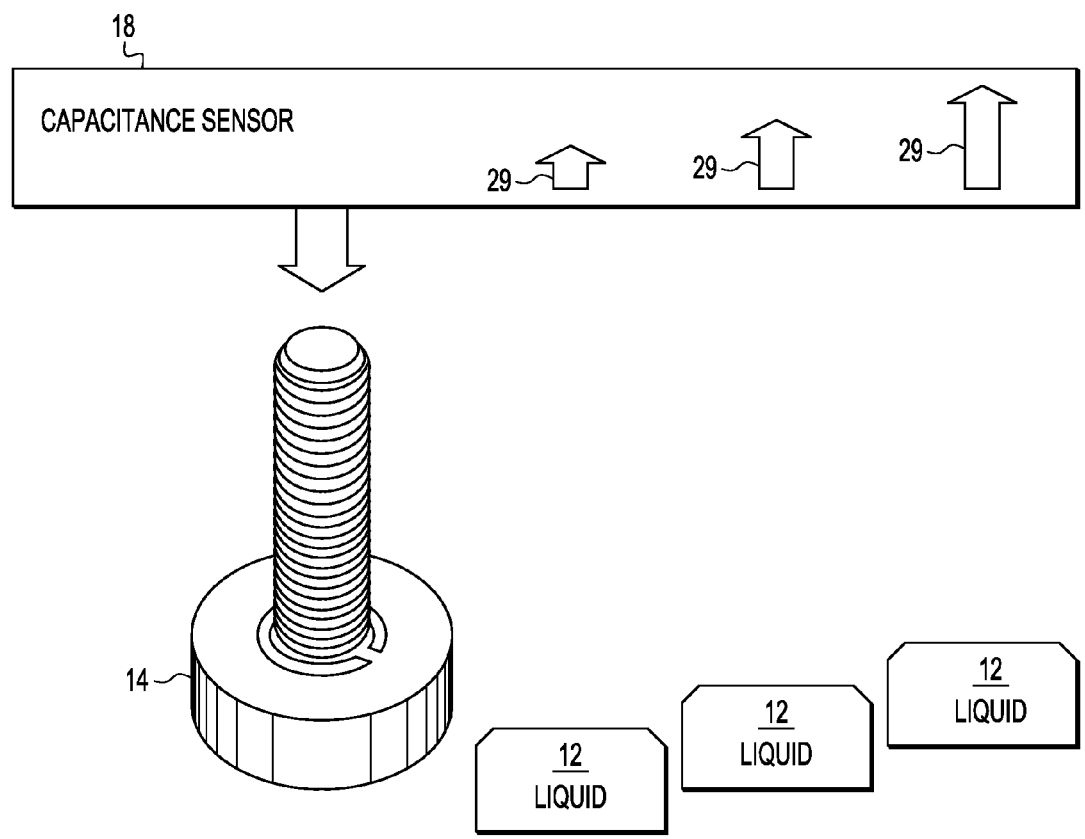
FIG. 3 is an illustrative view of a capacitance sensor and electrode as used for detecting liquid.

When the system 10 of FIG. 2 is embodied as an appliance such as a dishwasher as shown in FIG. 1, the electrode 14 can be embodied as a coated metal surface contact support element. One example of a metal surface contact that could be used in such an application is shown in FIG. 3. Shown is a known type of leveling metal foot screw found on many appliances. In this case the foot is shown with a rubber disk coating its lower portion. Other types of surface contacts that can be used are, without limitation, low conductivity metal feet, plates, mesh, heavy gauge wires, or coated metal feet, plates, mesh, wires, or the like, coated with materials such as but not limited to plastic, rubber, sprayed-on rubbers or epoxies, paint, or any other known low conductivity surface.

The capacitance sensor 18 is coupled to the electrode 14 as shown diagrammatically in FIG. 3. A capacitor is formed between the capacitance sensor 18 and the electrode 14. The dielectric between them is normally air. But this changes when liquid 12 spills onto the surface 16. Though the electrode 14 does not directly contact the liquid 12 because of the coating, as the liquid 12 rises around the coated surface contact, the dielectric constant of the liquid (e.g. approximately 80 for water) compared to air increases the dielectric of the space between the electrode 14 and the sensor 18 as the liquid height rises. This causes the capacitance between the electrode and the sensor to rise, as diagrammatically indicated by arrows 29. The capacitance sensor 18 detects this change. The change in capacitance causes a change in the signal 22 sent from the capacitance sensor 18 to the processor 20. The processor 20 coupled to the capacitance sensor 18 is configured to monitor the sensor 18 and send the indication signals 24 when liquid has been detected on the surface 16.

In accordance with various embodiments, other liquids can be detected provided the dielectric constant of the liquid is sufficiently higher than air to be detected by the capacitance sensor 18 (for example water mixed with additives such as detergents, contaminants, and the like). Generally, a detectable liquid should have a dielectric constant of at least 10 times the dielectric constant of air. However, it is possible to provide a capacitance sensor and electrode combination that can detect a liquid with a dielectric constant as low as only two times the dielectric constant of air. In the present embodiments disclosed above, generally the liquid has a dielectric constant of at least 30 times the dielectric constant of air. It is contemplated that an embodiment might be implemented in a gas environment other that air. In this case, the same dielectric ratios hold (e.g. the liquid being detected should generally have a dielectric constant at least 10 times greater than a corresponding dielectric constant in the gas environment).

The capacitance sensor 18 may be implemented as either a single electrode capacitance sensor or a double electrode capacitance sensor. In a single-electrode capacitance sensor, the capacitance sensor 18 forms one plate of the functional capacitor, while the other plate of the capacitor is formed by the electrode 14. In a double-electrode capacitance sensor 18, two or more plates exist in the capacitance sensor 18 forming a capacitor internal to the sensor 18, but the sensor itself is still for purposes herein, functionally measuring change in capacitance caused by the change in dielectric between the electrode 14 and sensor 18. The processor 20 may be implemented for example as a microcontroller of a type used for compensation and conditioning of capacitance sensor signals. Such microcontrollers include but are not limited to 8-bit, 16-bit, and 32-bit digital signal controllers that may include various options such as flash, external program control and touchsensing software. Software is available for use with families of microcontrollers to provide capacitance sensing functionality.

In one embodiment, the response circuit 26 is a failsafe circuit. Responsive action may take the form of shutting the appliance 10 down so that liquid 12 is quickly drained via normal channels and is no longer able to leak onto the surface 16. For example, in the case of a dishwasher, the responsive action may be that one or more relays activate in response to the indication signal 24 to drain the liquid 12 from the tub to a drainage pipe. In the case of an appliance that controls the flow of water, a responsive action may be that one or more relays activate in response to the indication signal 24 to cut off water input flow to the appliance 10.

The communication circuit 28 is particularly advantageous in remote communications enabled appliances. The communication circuit 28 may be embodied as a microcontroller including communications capability such as WiFi, 3G, 4G or the like. In response to a signal from the processor 20 that liquid is present on the surface 16, the communication circuit 28 sends a message to a user or owner or one responsible for maintaining the system 10 that a fault has occurred, preferably via a network 30, for example, the Internet.

The communication circuit 28 can be implemented to transmit a message in any one or more of many known ways, including but not limited to iPhone iMsg, cell phone text message, HTML, email, and proprietary protocols. In one embodiment, a message can be transmitted to remotely notify a user that something has gone wrong with the appliance 10—in particular that a leak occurred and that the appliance 10 has shut down. The user can thus make a decision as to whether to respond immediately. In another embodiment, the communication circuit 28 can be used to enable or disable to operation of the failsafe circuit 26. For example, the failsafe circuit 26 may be considered useful to the user only at times when the appliance 10 is running unattended. The user may decide to disable it when the user is present or near the appliance 10.

It is noted that the processor 20, response circuit 26, and communication circuit 28 may be located in overlapping hardware and/or software and are depicted functionally for clarity.

Further embodiments are contemplated for using a capacitance sensor to detect a liquid on a surface. For example, referring to FIG. 1 or FIG. 2, in accordance with one such embodiment, the surface 16 is a floor in an establishment such as a house. The electrode 14 is a coated metal plate or coated wire mesh or the like. The electrode 14 and capacitance sensor 18 are placed underneath the surface 16. In this embodiment, the capacitance sensor 18 sends a signal to a processor 20 if water is detected under the surface 16 of the floor. This may be interpreted to mean that any appliance in the establishment is leaking—or that the water supply to the establishment is leaking. The response circuit 26 may take any number of responsive actions. In one embodiment, it shuts down all appliances that may potentially leak water. In another embodiment, it shuts down the water supply to the establishment.

Figure 4:
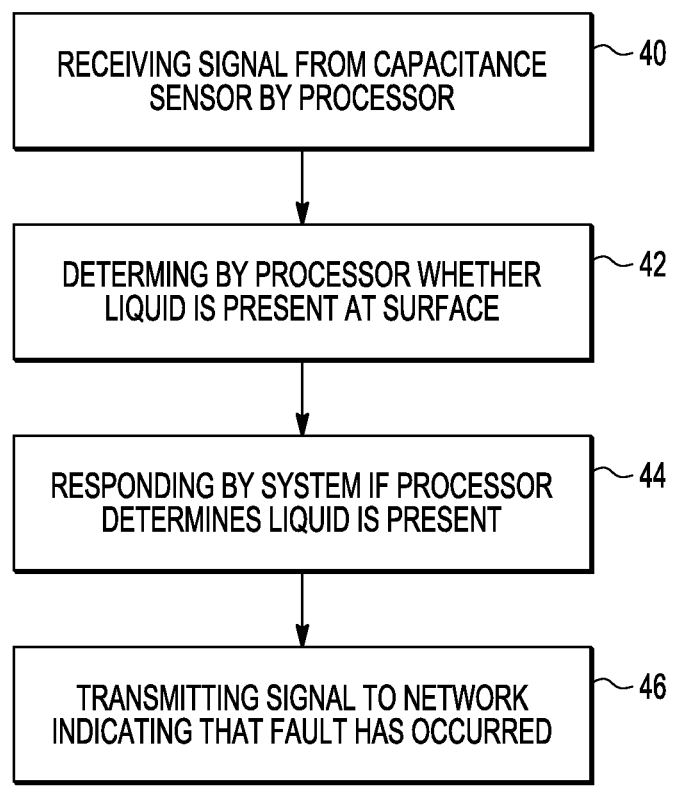
FIG. 4 is a flow diagram of a process by which a capacitive sensor is employed in a system for detecting liquid on a surface and is responded to by the system.

Referring to FIG. 4 and with reference to FIG. 1, a method includes the following steps. Step 40 includes receiving a signal from a capacitance sensor 18 by a processor 20. At step 42, the processor determines whether liquid is present at the surface in response to receipt of the signal from the capacitance sensor. At step 44, the system responds if the processor determines liquid is present at the surface. The response can include but is not limited to shutting down the system. At step 46, a signal is transmitted to the network indicating that a system fault has occurred.

As will be appreciated, embodiments disclosed included at least the following. In one embodiment, a system includes an electrode adapted for coupling the system to a surface, a capacitance sensor coupled to the electrode, and a processor coupled to the capacitance sensor. The processor is adapted to determine whether liquid is present at the surface in response to a signal received from the capacitance sensor, and transmit one or more indication signals if liquid is present at the surface. A response circuit is coupled to the processor. The response circuit is adapted for causing the system to take responsive action in response to receipt of an indication signal.

Alternative embodiments can include but are not limited to the following features. The system may further include a communication circuit coupled to the processor. The communication circuit is configured to transmit a signal indicating that a fault has occurred in the system in response to the one or more indication signals. Responsive action includes but is not limited to shutdown of the system. The communication circuit can be coupled to a network. The liquid sensed by the capacitance sensor can be water. The capacitance sensor can be a single electrode or double electrode capacitance sensor.

In another embodiment, a method for use in a system for leak detection includes the steps of receiving a signal from a capacitance sensor by a processor, determining by the processor whether liquid is present at the surface in response to receipt of the signal from the capacitance sensor. If liquid is present at the surface, responding by the system to the determination by the processor that liquid is present at the surface.

Alternative embodiments of the method can include one more of the following features. The method can include transmitting a signal to a network that a fault has occurred in the system. The step of responding can cause the system to shut down. In this method, the liquid can be water. The capacitance sensor can be a single electrode or double electrode capacitance sensor.

In another embodiment, an appliance includes an electrode for coupling the appliance to a surface. A capacitance sensor is coupled to the electrode. A processor is coupled to the capacitance sensor. The processor is adapted to determine whether water is present at the surface in response to a signal received from the capacitance sensor. The processor transmits one or more indication signals if water is present at the surface. A failsafe circuit is coupled to the processor. The failsafe circuit is adapted for causing the appliance to take failsafe action in response to receipt of one or more indication signals.

In alternate embodiments of the appliance, the appliance may also include a communication circuit. The communication circuit is coupled to the processor and configured to transmit a signal indicating that failsafe action has occurred in the appliance in response to the one or more indication signals. The communication circuit can be coupled to a network. The communication circuit may be configured to communicate with a user via a remote network connection. The failsafe can include but is not limited to shutdown of the system. The capacitance sensor can be a single or double electrode capacitance sensor.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system comprising:
   an electrode comprising a conducting portion connected to a low conductivity surface contacting a surface, the electrode forming a physical support element for the system;
   a capacitance sensor capacitively coupled to the conducting portion and configured to sense a capacitance determined by a dielectric constant of a liquid on the surface and a dielectric constant of a gas environment, the liquid covering a portion of the low conductivity surface without contacting the conducting portion, and a ratio of the dielectric constant of the liquid divided by the dielectric constant of the gas has a value of at least two;
   a processor coupled to the capacitance sensor, the processor configured to determine whether the liquid is present at the surface in response to a signal received from the capacitance sensor, and transmit one or more indication signals if the liquid is present on the surface, the signal indicating a change in the capacitance; and
   a response circuit coupled to the processor, the response circuit configured to cause the system to take a responsive action in response to receipt of the one or more indication signals.

2. The system of claim 1 comprising a communication circuit, coupled to the processor, configured to transmit a signal indicating that a fault has occurred in the system in response to the one or more indication signals.

3. The system of claim 2 wherein the communication circuit is coupled to a network.

4. The system of claim 1 wherein the responsive action comprises shutting down the system.

5. The system of claim 1 wherein the liquid is water.

6. The system of claim 1 wherein the capacitance sensor is a single electrode capacitance sensor.

7. The system of claim 1 wherein the capacitance sensor is a double electrode capacitance sensor.

8. A method for leak detection comprising the steps of:
   receiving a signal from a capacitance sensor by a processor;
   determining by the processor whether a liquid is present on a surface in response to receipt of the signal from the capacitance sensor, the signal responsive to a change in a capacitance between the capacitance sensor and a conducting portion of an electrode connected to a low conductivity surface contacting the surface, the capacitance determined by a dielectric constant of the liquid on the surface and a dielectric constant of a gas environment, the liquid covering a portion of the low conductivity surface without contacting the conducting portion, and a ratio of the dielectric constant of the liquid divided by the dielectric constant of the gas having a value of at least two;
   physically supporting with the electrode, a system including the capacitance sensor; and
   if the liquid is present at the surface, responding to the determination by the processor that the liquid is present on the surface.

9. The method of claim 8 comprising transmitting a signal to a network that a fault has occurred in the system.

10. The method of claim 9 wherein the network is a remote network.

11. The method of claim 8 wherein responding comprises shutting down the system.

12. The method of claim 8 wherein the liquid is water.

13. The method of claim 8 wherein the capacitance sensor is a single electrode capacitance sensor.

14. The method of claim 8 wherein the capacitance sensor is a double electrode capacitance sensor.

15. An appliance comprising:
   an electrode comprising a conductive portion connected to a low conductivity surface contacting a surface, the electrode forming a physical support element for the appliance;
   a capacitance sensor capacitively coupled to the conducting portion and configured to sense a capacitance determined by a dielectric constant of water on the surface and a dielectric constant of air, the water covering a portion of the low conductivity surface without contacting the conducting portion, and a ratio of the dielectric constant of the water divided by the dielectric constant of the air has a value of at least two;
   a processor coupled to the capacitance sensor, the processor configured to determine whether the water is present at the surface in response to a signal received from the capacitance sensor, and transmit one or more indication signals if the water is present on the surface, the signal indicating a change in the capacitance; and
   a failsafe circuit coupled to the processor, the failsafe circuit configured to cause the appliance to take a failsafe action in response to receipt of the one or more indication signals.

16. The appliance of claim 15 comprising a communication circuit, coupled to the processor, and configured to transmit a signal indicating that failsafe action has occurred in the appliance in response to the one or more indication signals.

17. The appliance of claim 16 wherein the communication circuit is coupled to a network.

18. The appliance of claim 16 wherein the communication circuit is configured to communicate with a user through a remote network connection.

19. The appliance of claim 15 wherein the failsafe action comprises shutdown of the appliance.

20. The appliance of claim 15 wherein the capacitance sensor is a single electrode capacitance sensor.

* * * * *